United States Patent [19]

Wolf et al.

[11] Patent Number: 5,201,489
[45] Date of Patent: Apr. 13, 1993

[54] SURFACE BEARING AND METHOD FOR ITS PRODUCTION

[75] Inventors: Franz J. Wolf; Hubert Pletsch, both of Bad Soden-Salmünster, Fed. Rep. of Germany

[73] Assignee: Woco Franz-Josef Wolf & Co., Soden-Salmünster, Fed. Rep. of Germany

[21] Appl. No.: 911,372

[22] Filed: Jul. 13, 1992

Related U.S. Application Data

[63] Continuation of Ser. No. 462,399, Jan. 8, 1990, abandoned.

[30] Foreign Application Priority Data

Jan. 23, 1989 [DE] Fed. Rep. of Germany ....... 3901898

[51] Int. Cl.$^5$ .............................................. F16F 9/10
[52] U.S. Cl. .................................. 248/638; 248/634; 267/141; 267/153; 267/145; 5/481; 5/468
[58] Field of Search ............... 248/638, 634, 633, 562; 5/481, 468; 267/145, 141, 153

[56] References Cited

U.S. PATENT DOCUMENTS 2,364,036 11/1944 Mackay et al. ................... 5/481 X
3,154,607 10/1964 Struthers ........................... 5/481 X
4,776,573 10/1988 Wolf et al. ...................... 248/634 X

FOREIGN PATENT DOCUMENTS 52-37675 3/1977 Japan.

Primary Examiner—Alvin C. Chin-Shue
Attorney, Agent, or Firm—Lowe, Price, LeBlanc & Becker

[57] ABSTRACT

The invention relates to a surface bearing 1 comprising a rubber strip or plate material penetrated by hollow channels 3 and cavities 2. The cavities 2 and hollow channels 3 all lie in a single surface at least essentially parallel or complementary in shape to the principal surface of the sheet material, each cavity 2 being penetrated in each case by only one hollow channel 3. The hollow channels 3 are open on at least one side and have a clear cross-sectional area which is at least a quarter of the largest cross-sectional area of the cavities 2 penetrated by this hollow channel 3. The hollow channels 3 can extend non-parallel to at least one longitudinal axis or to the longitudinal axis of the surface bearing, thus, for example, can form an angle of 90° or 45° with the latter, while they are parallel or non-parallel to one another. However, in the case of polygonal or circular surface bearings, they can also be aligned so as to extend radially to the center without intersecting or touching in the center, i.e. can also be open on only one side. An opening 6 formed in the center of the novel surface bearing 1 does not impair the bearing properties, instead offering numerous constructional possibilities. Overall, cushioning soft of heavy loads, free from the buckling effect, is obtained, substantial acoustic decoupling being achieved.

1 Claim, 3 Drawing Sheets

SURFACE BEARING AND METHOD FOR ITS PRODUCTION

This application is a continuation of application Ser. No. 07/462,399 filed Jan. 8, 1990 abandoned.

The invention relates to a surface bearing comprising a rubber strip or plate material penetrated by hollow channels and cavities. The cavities and hollow channels all lie in a single surface at least essentially parallel or complementary in shape to the principal surface of the bearing, each cavity being penetrated in each case by only one hollow channel.

Resilient surface bearings of this kind are generally used for cushioning relatively large masses, e.g. in mattress and machine construction, the soft cushioning with little noise of drive assemblies and engines of motor vehicles being of particular interest.

The achievement of a good combination of the effects of soft springing, i.e. of a shallow spring characteristic, as long a service life as possible and good acoustic decoupling, has always presented difficulties since, on the one hand, the material used should not be too hard and, on the other hand, the mechanical stressability and durability should not be too low. A further economic aspect is, in addition, the expenditure involved in production.

The previously used solid elastomer pads of relatively soft materials, in which rapid material fatigue was to be observed, have nowadays largely been replaced by bearings which are penetrated by hollow channels and cavities to reduce material loading. When the bearing is loaded, the cavities accommodate displaced elastomer material, while the hollow channels serve to connect the cavities, a pressure compensation thereby being made possible between said cavities.

In general, when used correctly, surface bearings are subject to only relatively small loads per unit area. However, as soon as higher loads occur, the cavity walls buckle (buckling effect), the restoring force thereby largely being lost. The spring characteristic then has a horizontal or, in most cases, falling gradient. As soon as the cavities present have been completely compressed, the shallow region of proportionality makes a rapid transition to the progressive region with a steeply rising characteristic. The bearing then shows the typical, here undesired, behaviour of a solid elastomer pad.

Bearings whose cavities and channels are filled with a fluid, are described as dampers. A bearing of this kind, the cavities of which are filled with a damping fluid, the effect of a hydraulic surface damper thereby being achieved, is known from Japanese Laid-Open Specification JP 52-37675 A and is used in the known form as, inter alia, a rebound wall or rail support. In this surface damper, the cavities are designed as vertical cylinders, i.e. the cylinder axes extend in the direction of the applied-load vector. In the case of the strip-like embodiment, these cylinder cavities are connected to one another by linear restrictor channels or in the case of the sheet-like configuration are connected by a hexagonal restrictor-channel network, i.e. three channels penetrate each hollow cylinder.

A connection of this kind between the cavities permits the damping fluid to overflow out of the loaded cavities into the unloaded and/or less loaded cavities, which are thereby expanded by virtue of the elasticity of the bearing material, as a result of which the material loading is reduced due to the reduction in the inhomogeneous stress concentration.

Disadvantages of bearings of this kind are that the fluid-filled and thus resiliently reinforced dampers, which are closed all round, do not respond to high-frequency low-amplitude oscillations and hence work relatively noisily and that, due to the inertia caused, inter alia, by the narrow restrictor channels, which is associated with great elastomer compression and thus a relatively steep rise in the spring characteristic, a desirably soft cushioning is not possible to the desired extent unless a softer material were used, although this in turn would considerably shorten the service life.

A further disadvantage is that, due to the adhesively bonded laminated structures, the production of bearings of this kind is expensive in terms of time, production and personnel and hence has to be carried out in a cost-intensive way.

It is therefore the object of the invention to create a surface bearing from a durable, relatively firm elastic material, which is suitable for cushioning high loads as stipulated and which nevertheless has a shallow spring characteristic over a wide restoring range, i.e. has a soft spring characteristic, which furthermore permits good acoustic decoupling and long service lives with undiminished functioning capacity and, in addition, can be produced easily, rapidly and economically.

This object is achieved by a surface bearing wherein the hollow channels are open on at least one side and have a clear cross-section, the area of which is at least one quarter of the size of the largest cross-sectional area of the nearest cavity penetrated by this hollow channel.

The novel surface bearing comprises a rubber strip or a rubber plate, in which uniformly distributed cavities and hollow channels are formed which all lie in a single surface at least essentially parallel or complementary in shape to the principal surface of the surface bearing. Each cavity of the rubber matrix is here penetrated by only one of the hollow channels, which preferably extend rectilinearly and are open on at least one side. In the preferred embodiment, the cavities are of spherical or spheroidal design, while the hollow channels preferably have a circular cylindrical form. In particular, all cavities and hollow channels are arranged in such a way that the center of each spherical cavity lies on the central axis of the hollow channel intersecting this cavity.

Essential here is that the hollow channels, which neither intersect nor touch, have a clear cross-section, the area of which is at least a quarter of the size of the greatest cross-sectional area of the nearest cavity penetrated by this hollow channel.

By means of this cross-section ratio it is ensured that, overall, a sufficiently large hollow volume is available inside the surface bearing, which can accommodate the displaced rubber material when the bearing body is compressed without extreme material stresses arising. The channels thus do not function as restrictor channels but themselves represent a deflection space for the rubber material, resulting in a softening of the surface bearing and a shallower spring characteristic. Due to the uniform distribution of the cavities and channels in the matrix of the surface bearing, the mechanical strength of the bearing body is not impaired despite the remarkable pore volume and, even under considerable applied loads, has a long service life. The deformation stresses occurring upon loading, which primarily affect the free internal and external surfaces of the rubber matrix, are distributed uniformly over the entire bearing body, with the result that, even when the bearing consists of a relatively firm and mechanically stable engineering material, the spring characteristic is decidedly soft and the spring characteristic accordingly has a broad and shallow region of proportionality and makes the transition into the progressive region with moderate curvature under only a relatively high load. In preferred embodiments of the invention, the hollow channels are aligned in such a way that they extend nonparallel to at least one or to the longitudinal principal axis of the sheet material and preferably enclose an angle of 90° or 45° with said axis, the channels being open on one or both sides. In the case of the channels open on only one side, the openings preferably lie alternately on the in each case opposite sides of the sheet material.

The channels here extend parallel to one another or form a plurality of groups of in each case mutually parallel channels, the central axes of which intersect one another without the hollow channels themselves intersecting or touching, thus, for example forming a herringbone pattern.

Alternatively, in the case of an essentially regularly polygonal or circular sheet material, the hollow channels can be aligned so as to extend radially to the center, although they neither intersect nor touch in the center and are thus only open on one side.

In the center of the novel surface bearing it is furthermore possible for an opening to be formed which, extending in the direction of the normal to the principal surface, i.e. in the direction of the applied-load vector, is a through opening or an opening closed on one side in the manner of a blind hole or a groove, none of the cavities or hollow channels opening into this central channel. A central opening of this kind permits numerous constructional possibilities, e.g. fixing possibilities. Additional lateral stabilization can be achieved by means of a stabilizing or guide rod passed through this opening. In this arrangement, the spring or acoustic properties of the bearing are in no way diminished Also surprising, overall, is the fact that, even in the case of a relatively shallow surface bearing pentrated in a single layer by cavities and hollow channels, markedly good spring properties and substantial acoustic decoupling can already be achieved.

The novel surface bearing is produced by compression molding or injection molding of rubber blends in a mold cavity containing mold cores. After the solidification of the elastomer mass, the reusable mold cores, consisting, for example, of steel, are removed from the mold cavity together with the molding, i.e. the molding is demolded. The rod-shaped mold cores, which are provided at regular intervals with thickened portions, are pulled out laterally, individually or in groups, from the molding. The surface bearing obtained is then immediately ready for use, the surface-bearing of engines or drive assemblies of motor vehicles being envisaged in particular as applications.

The invention is explained in greater detail below with reference to FIGS. 1 to 7, in which.

Figure 1:
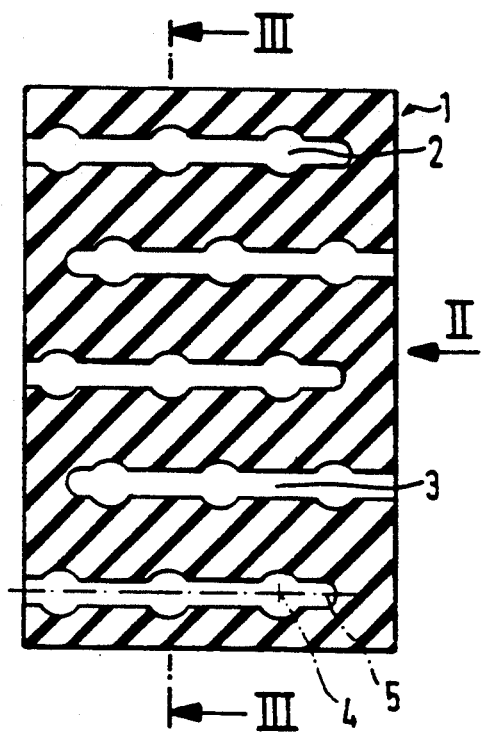
FIG. 1 shows, in schematic representation, a horizontal section through a surface bearing according to the invention.
Figures 2, 3:
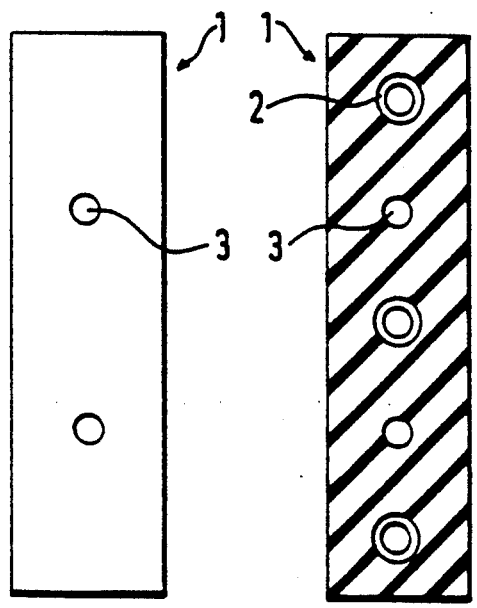
FIG. 2 shows the bearing according to FIG. 1 in side view.
FIG. 3 shows a vertical section in accordance with III—III in FIG. 1.

In the surface bearing 1 shown in FIGS. 1 to 3, the cavities 2 formed in the rubber matrix and the hollow channels 3 are distributed in such an arrangement that, as can be seen in particular in FIGS. 2 and 3, they lie in a single plane or surface parallel or complementary in shape to the principal surface of the sheet material.

The channels 3 extend at an angle of 90° to the longitudinal axis of the bearing, which in the drawing is oriented from the top to the bottom, parallel to one another, and are open on one side and alternately towards the opposite sides of the bearing body 1. Preferably, the spacing between the individual channels 3 is of equal size in each case. Each channel 3 penetrates a plurality of cavities 2, which are preferably at equal distances from one another, while, conversely, each cavity 2 is only penetrated by a single channel 3. The cross-sectional area of the circular cylindrical channels 3 is at least a quarter of the largest cross-sectional area of the spherical cavities 2, the centers 4 of the cavities 2 lying on the central axis 5 of the respective channel 3.

Figure 4:
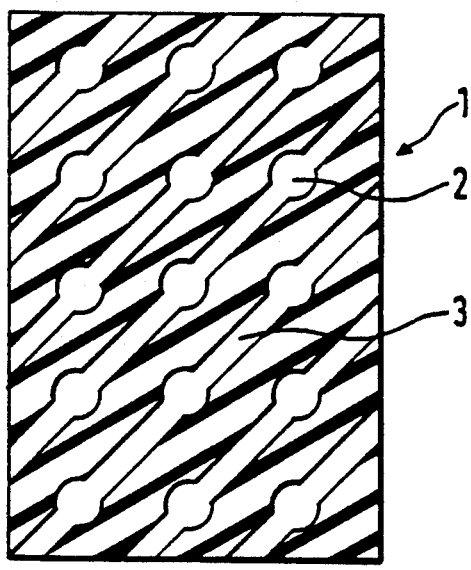
FIG. 4 shows, in schematic representation, a horizontal section through a second embodiment of the bearing according to the invention.

In contrast, the surface bearing 1 shown in FIG. 4 has hollow channels 3 which extend at an angle of 45° to the longitudinal axis of the bearing and are open on both sides.

Figure 5:
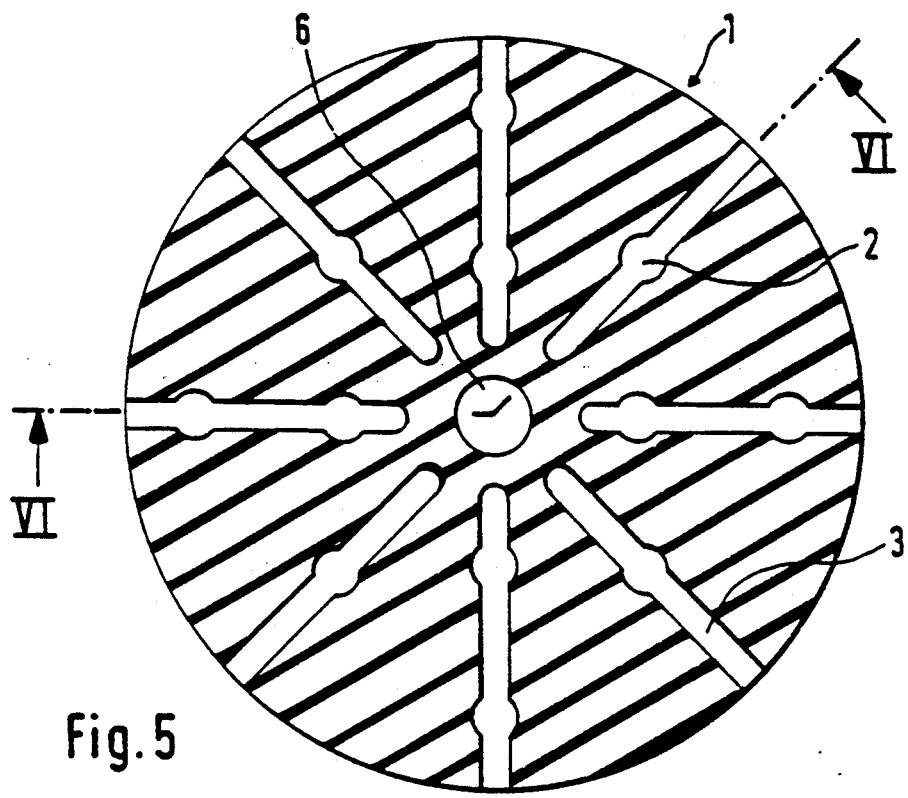
FIG. 5 shows, in schematic representation, a horizontal section through a third embodiment of the novel bearing.
Figure 6:
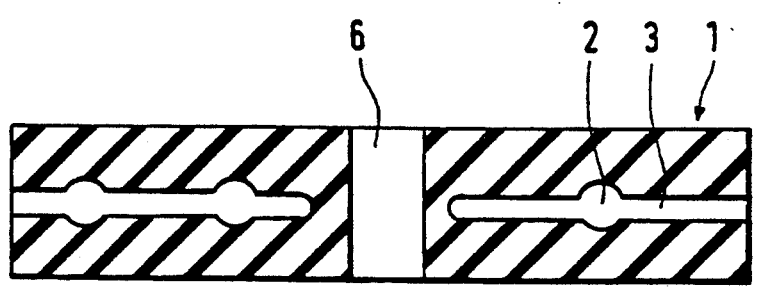
FIG. 6 shows a vertical section in accordance with VI—VI in FIG. 5.

The novel surface bearing 1 shown in FIGS. 5 and 6 comprises a circular sheet material in which the hollow channels 3 are once again formed so as to be open on only one side and extend radially towards the center. However, their length is such that they do not quite reach the opening 6 which is present in the center and extends in the direction of the normal to the principal surface, i.e. do not open into said opening. The central hole channel 6 is open on both sides, i.e. passes through the surface bearing 1 over its entire thickness.

Figure 7:
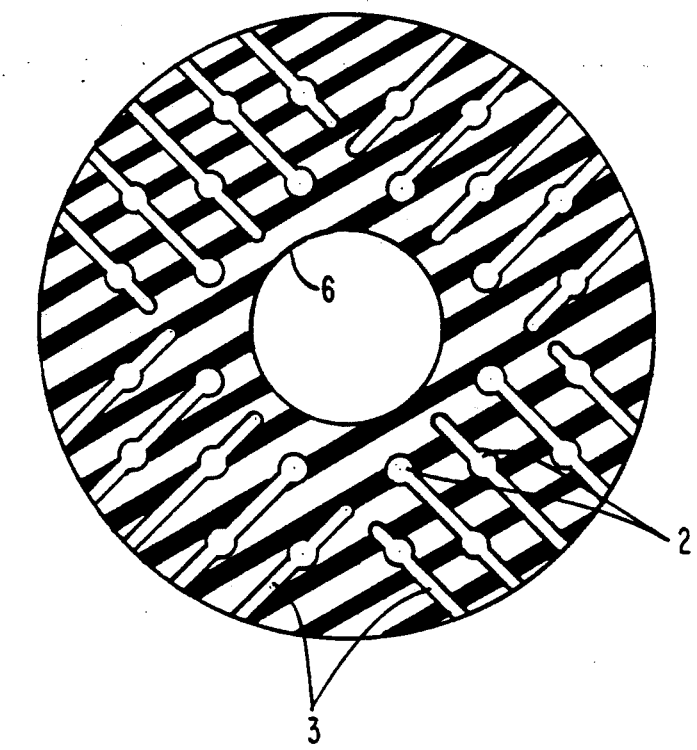
FIG. 7 shows, in schematic representation, a horizontal section through another embodiment of the novel bearing.

FIG. 7 is an illustration of a further embodiment wherein the channels 3 here extend parallel to one another or form a plurality of groups of in each case mutually parallel channels, the central axes of which intersect one another without the hollow channels 3 themselves intersecting or touching, thus, for example to form a herringbone pattern.

Given correct use, the novel surface bearings 1 shown in the figures are loaded in the direction of the normal to the principal surface, the elastomer material displaced being accommodated by the cavities 2 and the channels 3 or even 6. A soft spring action, free from the buckling effect, and good acoustic decoupling are thereby obtained. The demands made on surface bearings for engines in automotive construction are here fulfilled in all respects.

We claim:

1. In an automotive vehicle having an engine and wheels rotatably mounted to a chassis containing the engine and a drive assembly for transmitting rotative torque from the engine to the wheels, and a surface bearing disposed between the automotive drive assembly and the engine for cushioning and acoustically decoupling same, the improvement comprising said surface bearing including a plate made of resilient elastomer material interspersed with a plurality of hollow channels and cavities intersected by said channels, all of said hollow channels and cavities in said plate lying in a single plane extending at least essentially parallel to a principal load bearing surface of the plate or complementary in shape to the principal surface, each said cavity intersected by only one of said hollow channels, wherein none of the hollow channels intersect each other and said hollow channels are open at least at one end thereof and have a cross-section which is at least about ¼ of the size of the largest cross-sectional area of the nearest cavity intersected by said associated hollow channel.

* * * * *